US 009223722B2

(12) United States Patent
Waldspurger et al.

(10) Patent No.: US 9,223,722 B2
(45) Date of Patent: *Dec. 29, 2015

(54) EFFICIENT ONLINE CONSTRUCTION OF MISS RATE CURVES

(71) Applicant: VMware, Inc., Palo Alto, CA (US)

(72) Inventors: Carl A. Waldspurger, Palo Alto, CA (US); Rajesh Venkatasubramanian, San Jose, CA (US); Alexander Thomas Garthwaite, Hamilton, MA (US); Yury Baskakov, Newton, MA (US); Puneet Zaroo, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,100

(22) Filed: Mar. 4, 2014

(65) Prior Publication Data

US 2014/0189248 A1 Jul. 3, 2014

Related U.S. Application Data

(62) Division of application No. 12/942,765, filed on Nov. 9, 2010, now Pat. No. 8,694,728.

(51) Int. Cl.
*G06F 12/00* (2006.01)
*G06F 12/12* (2006.01)
*G06F 9/455* (2006.01)
*G06F 11/34* (2006.01)

(52) U.S. Cl.
CPC .......... *G06F 12/122* (2013.01); *G06F 9/45558* (2013.01); *G06F 11/3471* (2013.01); *G06F 12/123* (2013.01); *G06F 2009/45583* (2013.01); *G06F 2201/815* (2013.01); *G06F 2201/88* (2013.01)

(58) Field of Classification Search
CPC G06F 12/122; G06F 12/123; G06F 2201/815
See application file for complete search history.

(56) References Cited

U.S. PATENT DOCUMENTS

| 6,282,613 | B1 | 8/2001 | Hsu et al. |
| 6,704,925 | B1 | 3/2004 | Bugnion |
| 6,785,886 | B1 | 8/2004 | Lim et al. |
| 2004/0078532 | A1* | 4/2004 | Tremaine ...................... 711/160 |

(Continued)

OTHER PUBLICATIONS

Berg, E. et al., "StatCache: A Probabilistic Approach to Efficient and Accurate Data Locality Analysis", Technical Report 2003-058, Dec. 2003, Uppsala University, Department of Information Technology, Uppsala, Sweden, 8 pages.

(Continued)

*Primary Examiner* — Cheng-Yuan Tseng
*Assistant Examiner* — Arvind Talukdar

(57) ABSTRACT

Miss rate curves are constructed in a resource-efficient manner so that they can be constructed and memory management decisions can be made while the workloads are running. The resource-efficient technique includes the steps of selecting a subset of memory pages for the workload, maintaining a least recently used (LRU) data structure for the selected memory pages, detecting accesses to the selected memory pages and updating the LRU data structure in response to the detected accesses, and generating data for constructing a miss-rate curve for the workload using the LRU data structure. After a memory page is accessed, the memory page may be left untraced for a period of time, after which the memory page is retraced.

20 Claims, 9 Drawing Sheets

(56) References Cited

U.S. PATENT DOCUMENTS

| | | |
|---|---|---|
| 2005/0071599 A1 | 3/2005 | Modha et al. |
| 2009/0182994 A1 | 7/2009 | Bell, Jr. et al. |
| 2009/0187713 A1 | 7/2009 | Zedlewski et al. |

OTHER PUBLICATIONS

Cipar, J. et al., "Transparent Contribution of Storage and Memory", Technical Report 06-05, Jan. 2006, University of Massachusetts Amherst, Department of Computer Science, Amherst, MA, pp. 1-14.

* cited by examiner

Guest Memory Data Structure 210

| Page 0110 | 0 | X | XXXX |
| Page 0111 | 0 | X | XXXX |
| Page A    | 1 | 0 | 0000 |
| Page 0113 | 0 | X | XXXX |

*
*
*

| Page B | 1 | 1 | 0000 |

*
*
*

| Page C | 1 | 1 | 0000 |
| Page D | 1 | 1 | 0000 |

*
*
*

| Page E | 1 | 1 | 0001 |

*
*
*

| Page F | 1 | 1 | 0001 |

EFFICIENT ONLINE CONSTRUCTION OF MISS RATE CURVES

The present application is a divisional of and claims benefit of earlier-filed U.S. patent application Ser. No. 12/942,765, filed on Nov. 9, 2010.

BACKGROUND

A miss rate curve (MRC) describes the impact of memory allocation on the miss rate of a workload. A "miss" in this context refers to an access to a memory page not currently resident in memory, which incurs a page fault and requires the memory page to be retrieved from a slower tier of storage, such as disks, solid state drives, or a compression cache. Given the MRC data, an administrator or a memory allocation unit under control of a program may perform qualitative cost-benefit tradeoffs when allocating memory resources among multiple applications. Therefore, in situations where there is over-commitment of memory, such as virtual machines (VMs) running on a common host machine, the MRC data for the VMs can inform the administrator or the memory allocation unit how to allocate memory resources across the VMs in an optimal manner.

Various techniques are known in the art for constructing MRCs. Most existing MRC construction techniques rely on the Mattson Stack Algorithm, which maintains a least-recently used (LRU) ordered stack of memory references. In these techniques, all memory pages are traced for access, and page numbers corresponding to the memory pages are pushed onto the stack as they are referenced. When a page is accessed again, its stack distance from the top-of-stack position is noted, and its page number is moved to the top of the stack. The result is a histogram of accesses at various stack distances. This data can be used to compute the miss rate that would be observed at different memory allocations, and construct the MRC based on the relationship between the miss rates and the memory allocations.

The tracing of memory pages, however, incurs a fairly expensive page fault when any one of the memory pages is accessed. Handling these page faults typically consumes thousands of processor cycles. In addition, the memory space required to maintain an LRU ordered stack for all of the memory pages can be quite large. Consequently, although MRCs have been used in informing memory management decisions, the overheads reported for MRC construction techniques, in terms of memory space and processor cycles, are too high for online or production use.

SUMMARY

One or more embodiments of the present invention provide methods for constructing MRCs in a resource-efficient manner so that MRCs can be constructed and memory management decisions can be made while the applications are running. According to one embodiment, only a subset of the memory pages associated with an application is traced for access and a Mattson Stack Algorithm is applied to these memory pages to construct the MRC. According to another embodiment, after a memory page is accessed, the memory page is left untraced for a predefined period of time, after which the memory page is retraced. This prevents repeated accesses to the same memory page from incurring page faults when it is likely that the memory page will remain resident in memory during the predefined period of time.

A method of assessing memory performance of an application running on a host machine, according to an embodiment of the present invention, comprises the steps of selecting a subset of memory pages for the application, maintaining a least recently used (LRU) data structure for the selected memory pages, detecting accesses to the selected memory pages and updating the LRU data structure in response to the detected accesses, and generating data for constructing a miss-rate curve for the application using the LRU data structure. In additional embodiments of the present invention, the method may further comprise the step of setting a sampling period, wherein accesses to the selected memory pages are detected only once during any one sampling period.

BRIEF DESCRIPTION OF THE DRAWINGS

FIG. 2 shows the partial contents of a guest memory data structure as implemented in one or more embodiments of the present invention.

DETAILED DESCRIPTION

Figure 1:
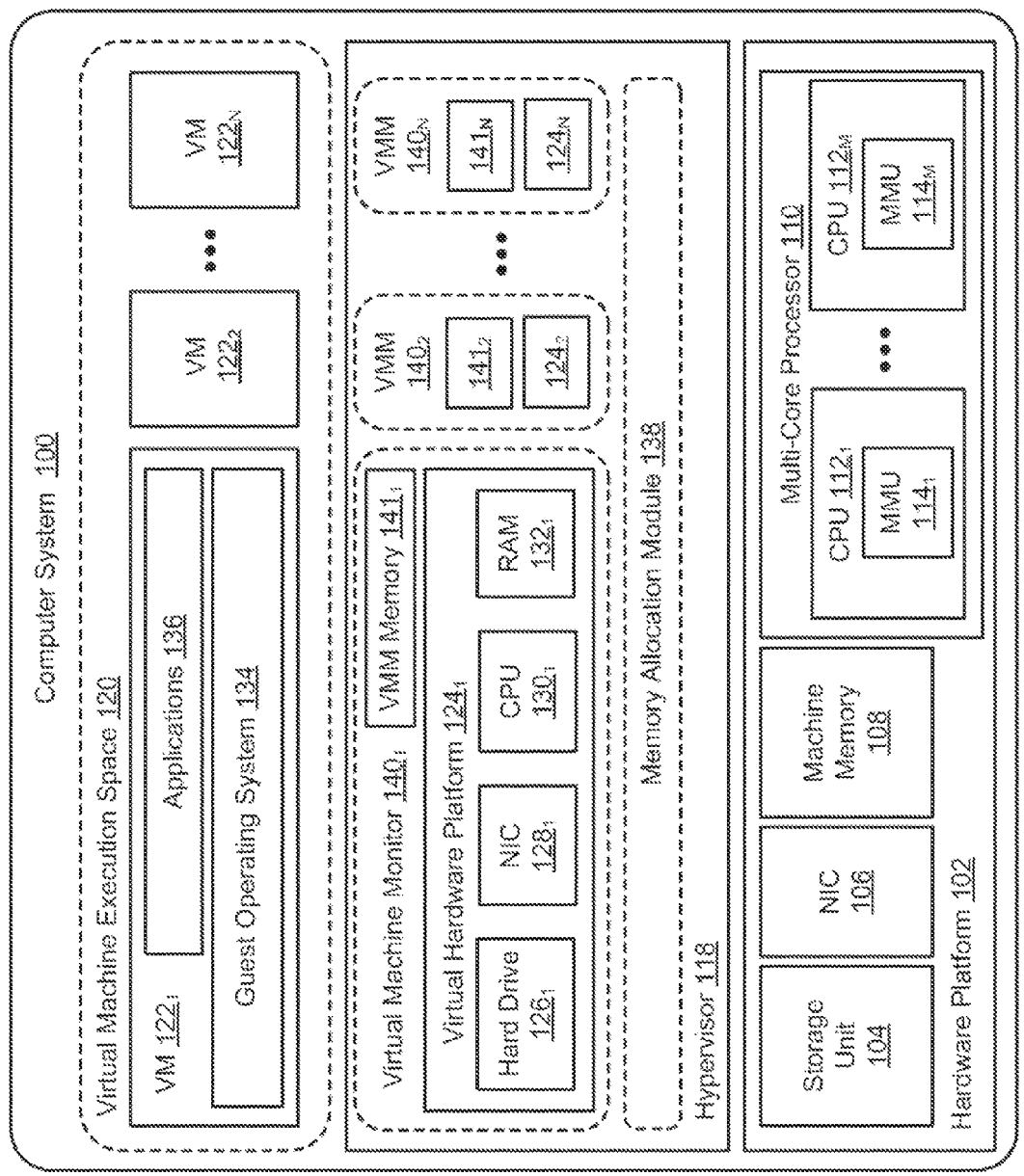
FIG. 1 is a block diagram illustrating a computer system configured to implement one or more aspects of the present invention.

FIG. 1 is a block diagram illustrating a computer system configured to implement one or more aspects of the present invention. Host computer system 100 may be constructed on a desktop, laptop or server grade hardware platform 102 such as an x86 architecture platform. Such a hardware platform may include a local storage unit 104, such as at least one hard drive, at least one network adapter (NIC 106), machine memory 108, one or more multi-core processors 110 (only one of which is illustrated in FIG. 1) and other I/O devices such as, for example and without limitation, a mouse and keyboard (not shown in FIG. 1). Multi-core processor 110 provides multiple CPUs $112_1$ to $112_M$ which operate concurrently and can read and write to any portion of machine memory 108. Each of CPUs $112_1$ to $112_M$ includes a memory management unit (MMU) 114.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as at least one virtual hard drive $126_1$, at least one virtual NIC $128_1$, one or more virtual CPUs $130_1$ (only one of which is illustrated in FIG. 1) and RAM $132_1$ for VM $122_1$. For example, virtual hardware platform $124_1$ may function as an equivalent of a standard x86 hardware architecture such that any x86 supported operating system, e.g., Microsoft Windows®, Linux®, Solaris® x86, Novell NetWare®, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform $124_1$, into corresponding requests to corresponding physical devices in hardware platform 102. Hypervisor 118 further comprises a memory allocation module 138 that allocates memory resources among VMs 122 according to shares (also known as "weights" or "tickets") assigned to the VMs 122, which represent a measure of each VM's entitlement to the memory resource relative to the other VMs. Further details of memory allocation based on shares are described in U.S. Pat. No. 7,412,492, the contents of which are incorporated by reference herein. In addition, as further described below, memory allocation module 138 is configured to dynamically adjust memory resources allocated to VMs 122 based on various characteristics of their MRCs.

It should be recognized that alternative computer systems may be configured to implement one or more aspects of the present invention, including, for example, computer systems with one or more single-core hardware processors. It should further be recognized that the various terms, layers and categorizations used to describe the virtualization components in FIG. 1 may be referred to differently without departing from their functionality or the spirit or scope of the invention. For example, virtual hardware platforms $124_1$-$124_N$ may be considered to be part of virtual machine monitors (VMM) $140_1$-$140_N$ which implement the virtual system support needed to coordinate operations between hypervisor 118 and their respective VMs. Alternatively, virtual hardware platforms $124_1$-$124_N$ may also be considered to be separate from VMMs $140_1$-$140_N$, and VMMs $140_1$-$140_N$ may be considered to be separate from hypervisor 118. One example of hypervisor 118 that may be used in accordance with the teachings herein is included as a component of VMware's ESX™ product, which is commercially available from VMware, Inc. of Palo Alto, Calif. It should further be recognized that other general purpose operating systems and virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives. In addition, it should be recognized that general purpose operating systems can use the techniques described herein to determine per-process memory allocations.

In computer system 100, in which VMs 122 employ guest operating systems 134 to provide guest virtual memory to guest physical memory mappings, hypervisor 118 provides guest physical memory to machine memory mappings. The guest virtual memory space is mapped to the guest physical memory space using guest page tables and the guest physical memory space is mapped to the machine memory space using nested page tables that are managed by hypervisor 118. In some embodiments, the guest virtual memory space may be mapped directly to the machine memory space using shadow page tables that are managed by hypervisor 118.

According to one or more embodiments of the present invention, data needed to construct an MRC for a VM are maintained by a VMM through a VMM memory module 141. Each such VMM memory module 141 stores metadata for guest memory pages in a guest memory data structure 210, the contents of which are partially shown in FIG. 2, and a least recently used (LRU) data structure, the contents of which are partially shown in FIGS. 3A and 3B. Referring to FIG. 2, guest memory data structure 210 stores for each guest memory page 211: (i) a bit 212 that indicates whether or not accesses to that page are to be traced, as will be further described below, (ii) a bit 213 that indicates whether or not the page has been accessed during the most recent sampling period, and (iii) an index field 214 that stores an index that references a particular group of memory pages, referred to herein as a "chunk," to which the page belongs. It should be recognized that many alternative data structures may be used to keep track of whether or not accesses to a particular page are to be traced, whether or not a traced page has been accessed during the most recent sampling period, and the chunk index. Also, such information may be stored in a single data structure or in different data structures. For example, bit 213 that indicates whether or not the page has been accessed during the most recent sampling period and index field 214 that stores the chunk index may be maintained only for traced pages. In addition, different ways of grouping traced pages to reduce the overhead in updating the LRU data structure in accordance with the techniques described below are within the scope of the present invention.

Figure 3A:
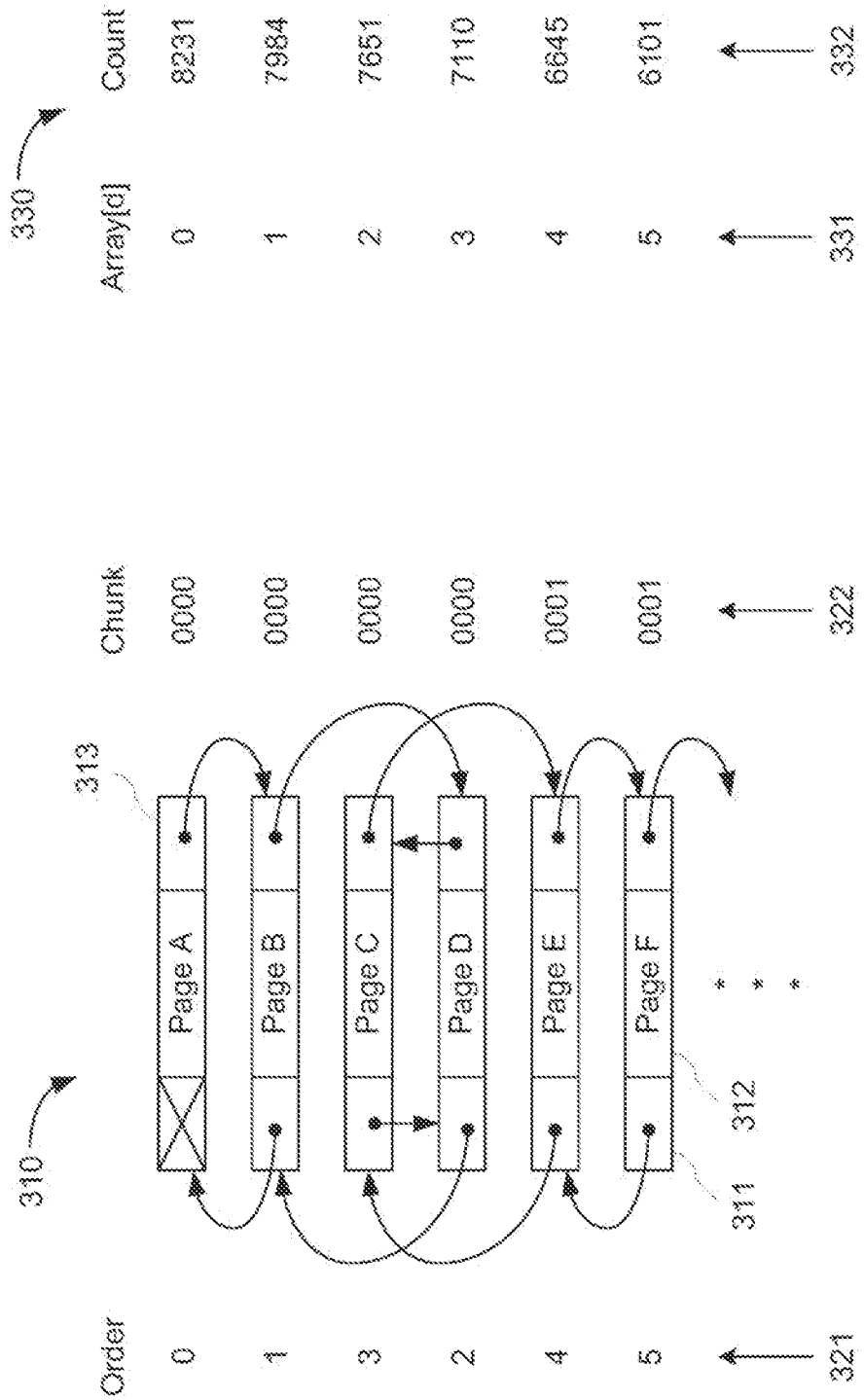
FIGS. 3A and 3B show the partial contents of a data structure used to track memory accesses to pages and keep the pages in a least-recently-used (LRU) order, before and after a page is accessed, as implemented in one or more embodiments of the present invention.
Figure 3B:
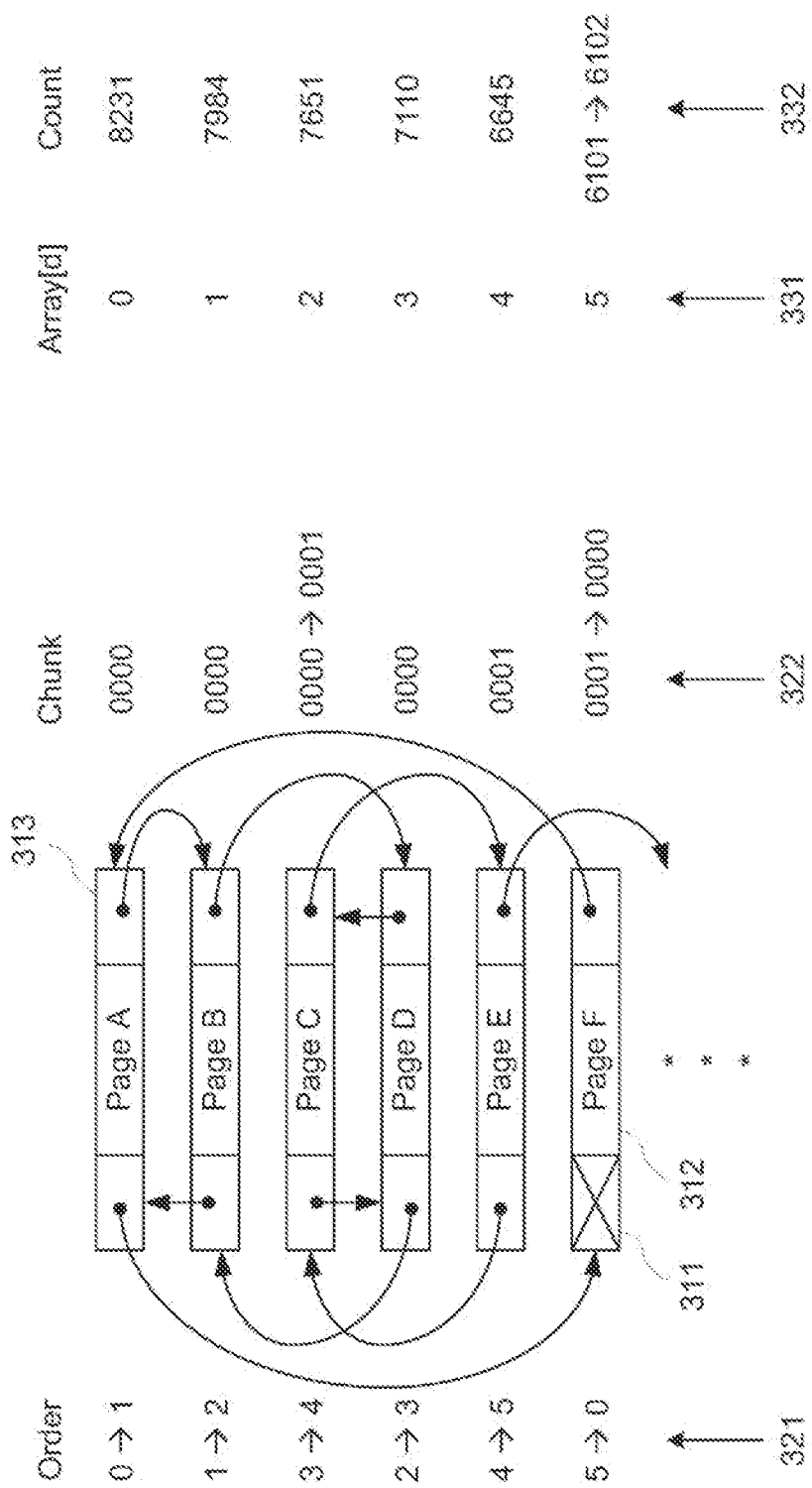

FIGS. 3A and 3B partially show the contents of the LRU data structure before a page, Page F, is accessed (FIG. 3A) and after Page F is accessed (FIG. 3B). The LRU data structure includes a doubly-linked list 310 and a count array 330. Doubly-linked list 310 contains a plurality of entries, each having a backward reference 311 to a previous entry, a page number reference 312, and a forward reference 313 to a next entry. It should be recognized that the first element does not have any backward reference and the last element does not have any forward reference. For illustrative purposes, order number 321 and chunk index 322 associated with each of the entries of doubly-linked list 310 are also shown in FIGS. 3A and 3B.

Count array 330 maintains a running count for each of different order numbers and increments the count for a particular order number when a memory page having that order is accessed. For example, when a memory page, Page F, having an order number 5 is accessed, the count value associated with order number 5 is incremented by one as shown in FIG. 3B. In addition, backward reference 311 for Page F is removed; forward reference 313 for Page F is changed to reference Page A; backward reference 311 for Page A is changed to reference Page F; and forward reference 313 for Page E is changed to reference the page that Page F was previously referencing with its forward reference 313. Page F is now the top entry (first in order) in doubly-linked list 310, followed by Page A, Page B, Page D, Page C, Page E, and so forth. As a result of the reordering, the page that is accessed, Page F, is assigned chunk index of 0, and the pages that had a higher rank than Page F (prior to the reordering) and were positioned at the tail of a chunk have their chunk indices incremented by one. In the example given in FIGS. 3A and 3B, Page C meets these criteria and its chunk index is incremented by one.

In alternative embodiments of the present invention, data structures other than a doubly-linked list data structure may be used for maintaining an LRU-ordered stack of memory pages. These other data structures include arrays, skip lists, hash tables, different types of linked lists, and other applicable well-known data structures.

Access to a VM's memory page is determined by a corresponding VMM by installing a trace on that memory page. In one embodiment, a memory page is traced by modifying its page table entry to remove its mapping from the guest-physical memory space to the machine memory space so that any guest access to the memory page faults into the VMM and causes the VMM to carry out the process for updating guest memory data structure 210 and the LRU data structure as described above. In another embodiment, a memory page is traced by setting the present bit in a page table entry corresponding to the memory page to 0, to indicate that the mapping for the memory page from the guest-physical memory space to the machine memory space is not present. Alternatively, a VM's memory page can be traced using any method that is transparent to the VM and generates a fault into the VMM. Changing the write protection in the page table entry (i.e., setting the read-only bit) corresponding to the memory page may be one alterative example. Also, traces may be configured to trigger only upon writes or upon both reads and writes. Other embodiments for tracing may not require generation of faults. These include scanning page table entries of memory pages at periodic intervals in some random or address order to see if their accessed or dirty bits have been set and then clearing any bits that have been set. In addition, in computer systems that utilize shadow page tables, which map guest virtual memory pages directly to machine memory pages, traces are installed on a guest-physical memory page by modifying the shadow page table entry of one or more guest-virtual memory pages corresponding to the guest-physical memory page. A backmap maintained by the guest's VMM is used to identify the one or more guest virtual memory pages that correspond to the guest-physical memory page being traced.

According to one or more embodiments of the present invention, a spatial sampling technique is employed to reduce the number of guest-physical pages that need to be traced. In one embodiment, a small, uniformly-distributed subset of "S" guest-physical pages is randomly selected by the VMM when the VM is instantiated. Upon selection of the pages, guest memory data structure 210 maintained by the VMM is updated to indicate that the selected pages are to be sampled by setting of bit 212 corresponding to the selected pages. It should be recognized that the first access of any selected page will cause the page to be moved to the top of doubly-linked list 310 without any updates to count array 330. However, the addition of this new page to the top of doubly-linked list 310 will cause the chunk indices of pages positioned at the tail of a chunk to be incremented by one. The set of memory pages to be sampled may be statically determined or varied periodically as the VM is executing. The inventors have observed accurate construction of MRCs even when the number of pages in the sampled set is as low as 1024 for a VM that is 2 GB, representing less than 0.2% of the total number of pages.

In some embodiments of the present invention, a temporal sampling technique is employed to reduce the cost of repeated accesses to a single sampled page. After a traced page is accessed and incurs a page fault, the page is left untraced (i.e., remains mapped) for a period of time, referred to herein as the "sampling period." This is to prevent page faults from being triggered repeatedly during a period of time, e.g., 100 milliseconds, when it is likely that the page will remain resident in memory. At the conclusion of the sampling period, the trace on that page is reinstalled (i.e., page is unmapped), so that subsequent accesses will again incur page faults. Alternatively, the sampled pages that are accessed frequently are marked for temporal sampling. The other pages in the sampled set are continually sampled.

Alternative embodiments of the present invention employ different techniques for tracing pages that have been selected for sampling. In one alternative embodiment, instead of installing an explicit trace on the sampled pages (i.e., through unmapping, for example), upon any fault or faults generated by some clock or performance counter, a data structure that tracks sampled pages (e.g., guest memory data structure 210) is consulted to see if any memory page or pages being accessed by the faulting instruction or event are sampled pages. If any of the accessed memory pages are sampled pages, the method described above for updating the LRU data structure is carried out for such pages.

When the spatial sampling technique described above or both the spatial and temporal sampling techniques described above are employed, the overhead required to obtain the data needed to construct an MRC can be drastically reduced. As a result, the methods described herein may be deployed for online use in production systems.

The chunk index described above is employed to reduce the overhead of computing the distance from the top of doubly-linked list 310 of the memory page that is accessed (also referred to as "stack distance"), i.e., determining which element of count array 330 that should be incremented by one. In the embodiment of the present invention described above, guest memory data structure 210 stores the chunk index corresponding to each sampled memory page. The stack distance of the accessed memory page is computed by retrieving the chunk index i of the accessed memory page from guest memory data structure 210, and traversing doubly-linked list 310 starting with the first page that is in the same chunk as the accessed memory page. When the page is found, the stack distance of the accessed memory page is computed as the number of pages traversed within this same chunk plus the number of pages in earlier chunks, which is equal to i×chunk size, where the chunk size is equal to S, the number of sampled pages, divided by C, the number of chunks.

Figure 4:
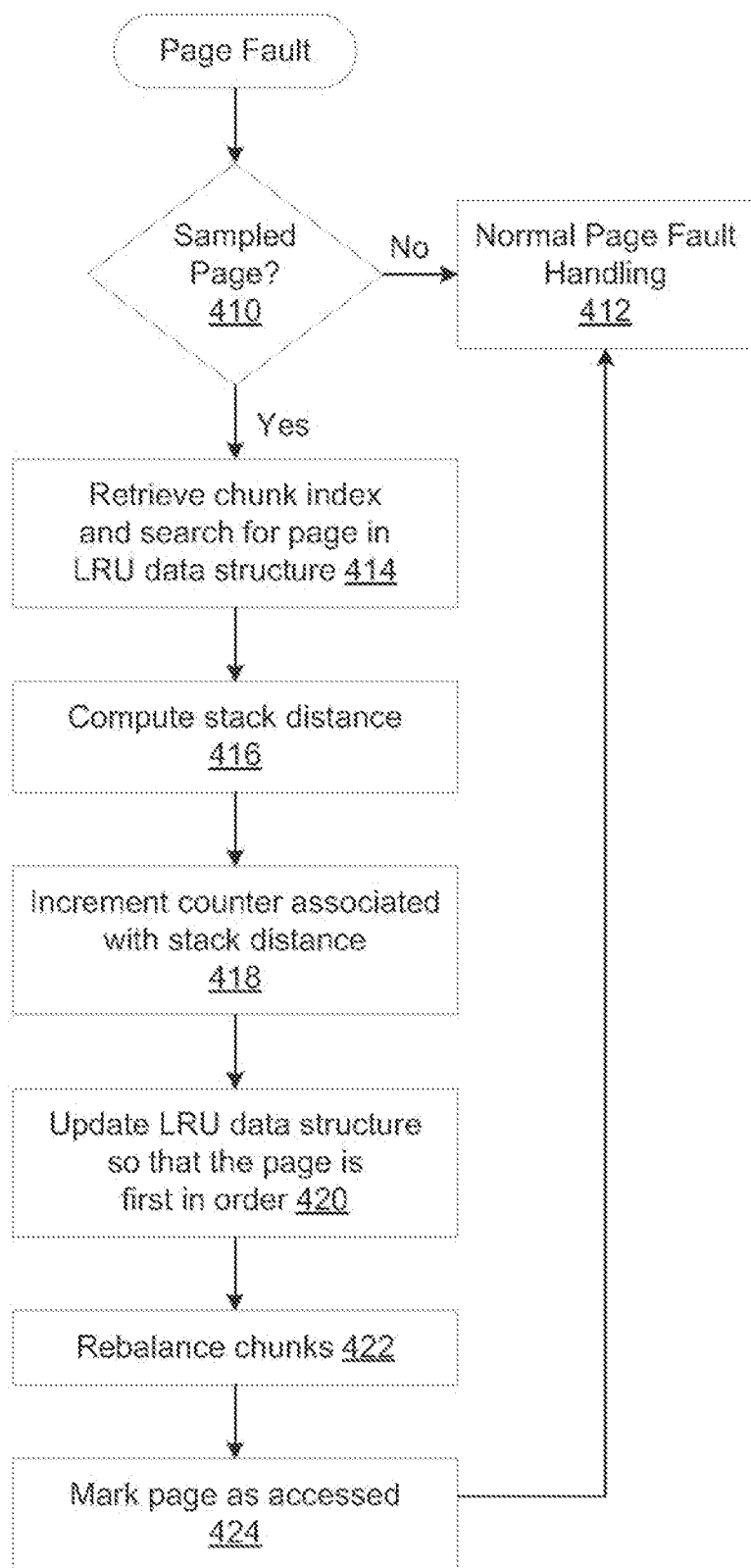
FIG. 4 is a flow diagram that illustrates the method for handling page faults according to one or more embodiments of the present invention.

FIG. 4 is a flow diagram that illustrates the method for handling page faults according to one or more embodiments of the present invention. Although the method steps are described in conjunction with the system of FIG. 1, these method steps carried out in any system are within the scope of the invention.

At step 410, when a page fault traps into the VMM, the VMM consults guest memory data structure 210 to see if the page is a sampled page. If it is not, normal page fault handling is carried out at step 412. If it is a sampled page, the VMM retrieves the chunk index corresponding to the page from guest memory data structure 210 and searches for the page in the LRU data structure, i.e., traverses doubly-linked list 310. When the page is found, the stack distance of the accessed memory page is computed as the number of pages traversed within this same chunk plus the number of pages in earlier chunks as described above (step 416). Next, at step 418, the element of count array 330 associated with the computed stack distance is incremented. At step 420, the LRU data structure is updated so that the page is at the top of doubly-linked list 310. Chunks are rebalanced at step 422, based on the updated LRU positions of the sampled pages. At step 424, guest memory data structure 210 is updated to mark the page as having been accessed. Consistent with the temporal sampling technique described above, traces on these pages are not reinstalled right away. The reinstalling of the traces is deferred until the end of the current sampling period as described below in conjunction with FIG. 5. The flow then returns to step 412 where normal page fault handling is carried out.

Figure 5:
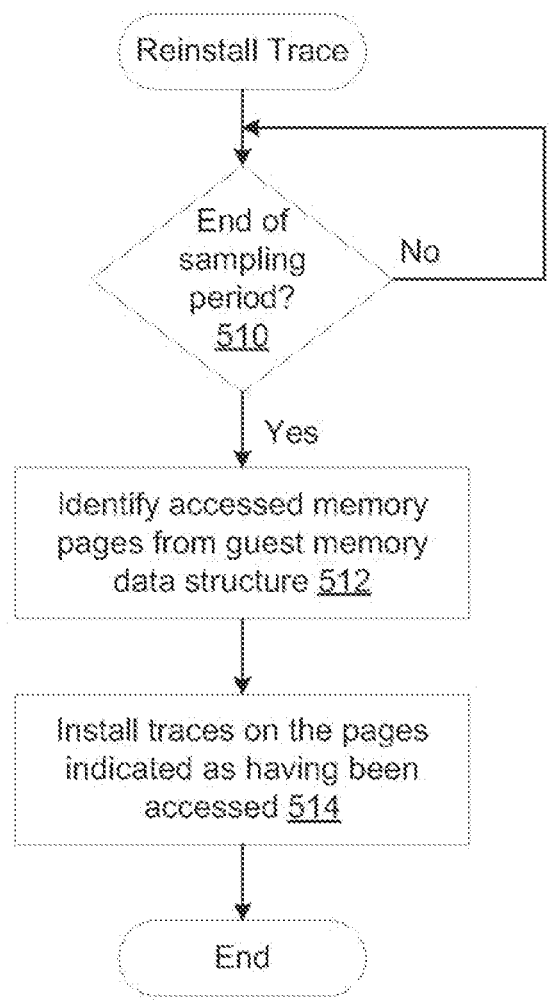
FIG. 5 is a flow diagram that illustrates the method for reinstalling traces according to one or more embodiments of the present invention.

FIG. 5 is a flow diagram that illustrates the method for reinstalling traces according to one or more embodiments of the present invention. Although the method steps are described in conjunction with the system of FIG. 1, these method steps carried out in any system are within the scope of the invention.

At step 510, VMM monitors for the end of a sampling period. At the end of the sampling period, VMM accesses guest memory data structure 210 to identify memory pages that have been marked as having been accessed during the sampling period (step 512). At step 514, traces are installed on those memory pages identified in step 512. As described above, traces may be installed on memory pages by removing the mappings of the memory pages from the guest-physical memory space to the machine memory space.

Figure 6:
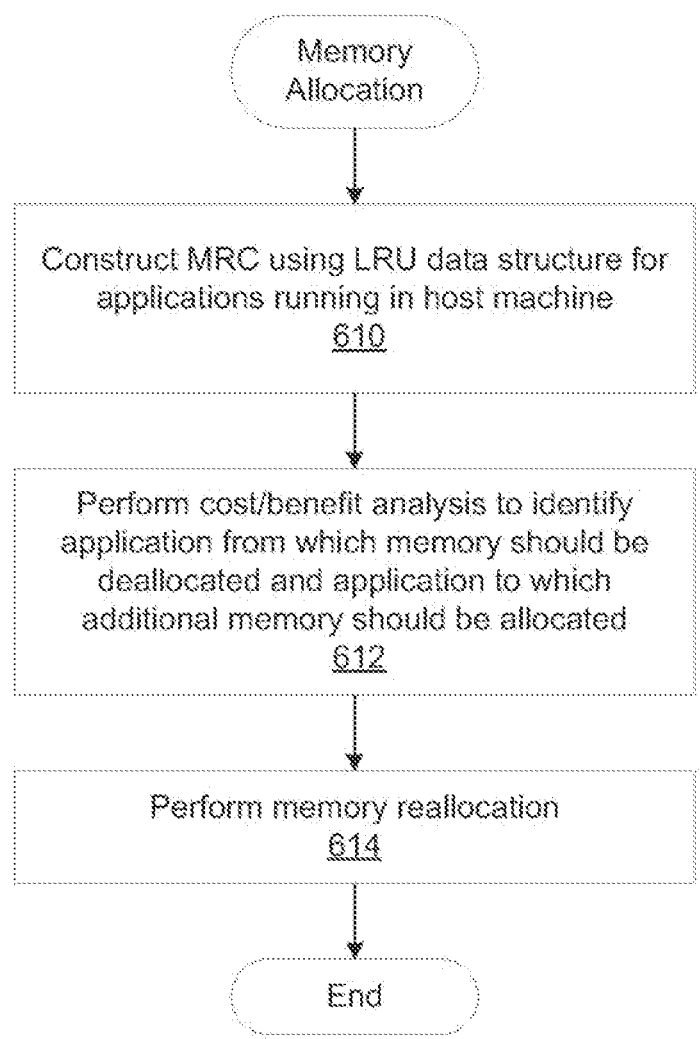
FIG. 6 is a flow diagram that illustrates the method for allocating memory resources among VMs according to one or more embodiments of the present invention.

FIG. 6 is a flow diagram that illustrates the method for allocating memory resources among VMs according to one or more embodiments of the present invention. Although the method steps are described in conjunction with the system of FIG. 1, these method steps carried out in any system are within the scope of the invention.

At step 610, MRCs for VMs running in host computer system 100 are constructed from the data stored in the LRU data structures maintained by the corresponding VMMs. Either VMM 140 or memory allocation module 138 of hypervisor 118 may construct the MRCs from the data stored in the LRU data structures using any of the well-known methods. At step 612, a cost/benefit analysis is carried out to identify the VM from which memory should be deallocated and the VM to which additional memory should be allocated. In carrying out the cost/benefit analysis, the costs and the benefits may be weighted by the importance of the VM, e.g., based on their assigned shares or other administrative or quality-of-service controls, such as reservations, limits, priorities, and the like, which are implemented to improve performance, fairness, or other metrics. Memory reallocation is then performed manually by an administrator or automatically under program control at step 614 according to the results of the cost/benefit analysis of step 612.

Figure 7A:
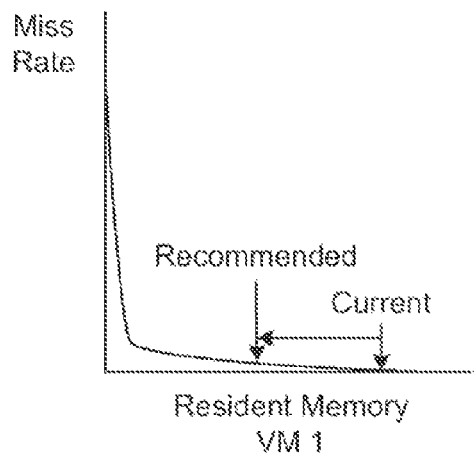
FIGS. 7A-7B and 7C-7D show miss rate curves that illustrate the benefits of carrying out memory allocation according to the method of FIG. 6.
Figure 7B:
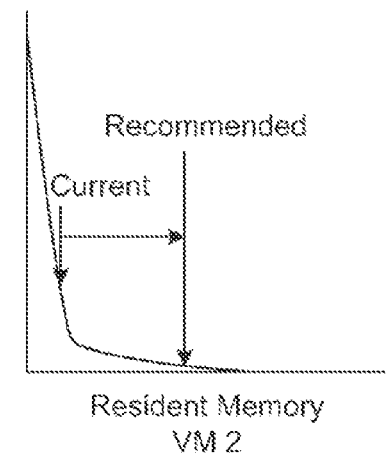
Figure 7C:
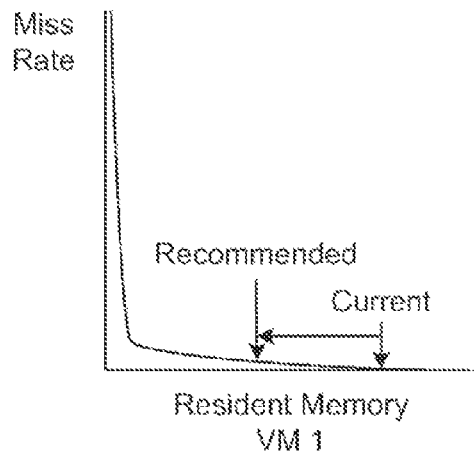
Figure 7D:
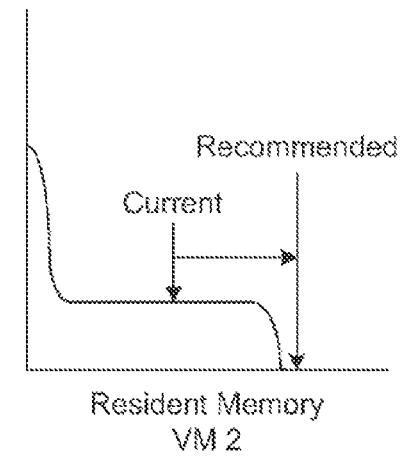

FIGS. 7A and 7B respectively illustrate MRCs constructed for two VMs running on the same host machine and show one example of carrying out the method of FIG. 6. FIGS. 7C and 7D respectively illustrate MRCs constructed from two VMs running on the same host machine and show another example of carrying out the method of FIG. 6. In both FIGS. 7A and 7B and FIGS. 7C and 7D, a more optimal memory allocation is achieved by deallocating memory from VM 1 and allocating that memory to VM 2. The memory reallocation may be performed to achieve various other goals including equalizing the miss-rates if the two VMs are equally important or scaling the miss rates in accordance with the assigned shares.

In non-uniform memory access (NUMA) architectures having one or more virtual CPUs (vCPUs), the MRCs may be constructed per vCPU or per group of vCPUs, and used to recommend migration of vCPUs or pages between NUMA nodes. In NUMA architectures, it is advantageous for virtual CPUs (vCPUs) of a VM to access local memory as much as possible. The techniques described above may help with this by generating MRCs on a per-vCPU and per-NUMA node basis. Memory locality (and hence performance) can be improved by either migrating each vCPU to the NUMA node from which it is accessing memory the most; or by migrating a vCPU's frequently accessed pages to the NUMA node where the vCPU is executing. It should be recognized that these optimizations can additionally be applied to a group of vCPUs (possibly a whole VM), instead of a single vCPU, by keeping track of per-NUMA node MRCs for the group of vCPUs instead.

Figure 8:
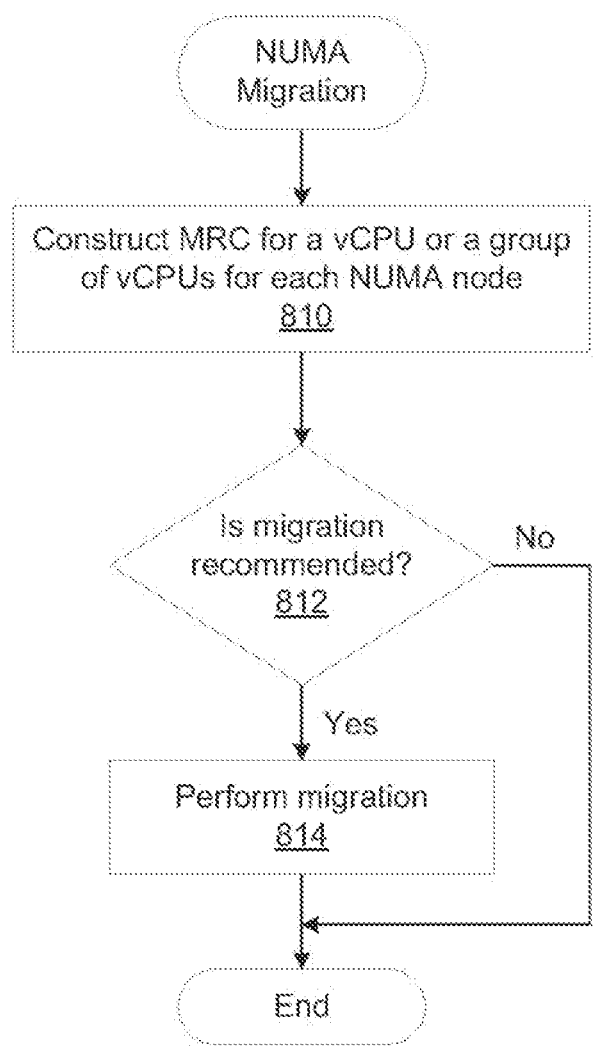
FIG. 8 is a flow diagram that illustrates the method for performing non-uniform memory access (NUMA) migration according to one or more embodiments of the present invention.

FIG. 8 is a flow diagram that illustrates the method for performing non-uniform memory access (NUMA) migration according to one or more embodiments of the present invention. This method begins with the construction of MRCs on a vCPU or a group of vCPUs (hereinafter referred to as "vCPUs") for each NUMA node (step 810). From these MRCs, the working sets of memory pages of the vCPUs can be determined on a per NUMA node basis, and migration may be recommended at step 812 based on this information. If the largest working set is at a remote node, migration is performed at step 814. In one embodiment, the vCPUs are migrated to the remote node. In another embodiment, the memory pages of the vCPUs at the remote node are migrated to the node of the vCPUs. The migration of the vCPUs or the memory pages between NUMA nodes may be carried out using any of the techniques known in the art. On the other hand, if the largest working set is at a local node, migration is not recommended and the method ends.

In other embodiments, only shared pages may be selected as the guest-physical pages to be sampled, and MRCs are constructed from the LRU data structure that is maintained for the shared pages. It may also be useful to construct and observe MRCs at the level of machine memory pages or for any arbitrary subset of machine memory pages.

Although embodiments of the present invention have been described as being applied in a virtual machine environment and a hypervisor that allocates memory between virtual machines, the techniques described herein are also applicable to a general purpose operating system that allocates memory between applications. For example, in an application that consists of multiple threads/processes/tasks, the MRCs may be constructed per any portion of a computation such as per thread/process/task or per any individual component, module, or virtual CPU of an application.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of managing memory allocation in a host machine having workloads running therein, comprising:
selecting a subset of memory pages for a first workload running on the host machine and maintaining a first least recently used (LRU) data structure for the selected memory pages of the first workload, the first LRU data structure including a counter for each position in the first LRU data structure, wherein each of the selected memory pages of the first workload is assigned a group number representative of its position in the first LRU data structure;
selecting a subset of memory pages for a second workload running on the host machine and maintaining a second LRU data structure for the selected memory pages of the second workload, the second LRU data structure including a counter for each position in the second LRU data structure, wherein each of the selected memory pages of the second workload is assigned a group number representative of its position in the second LRU data structure; and
while the first workload and the second workload are running:
detecting accesses to the selected memory pages of the first workload;
in response to detecting each access to a selected memory page of the first workload, identifying a counter to be incremented using the group number of the selected memory page of the first workload, incrementing the identified counter, and updating positions of the selected memory pages of the first workload in the first LRU data structure and the group numbers assigned to the selected memory pages of the first workload based on their updated positions in the first LRU data structure;
detecting accesses to the selected memory pages of the second workload;
in response to detecting each access to a selected memory page of the second workload, identifying a counter to be incremented using the group number of the selected memory page of the second workload, incrementing the identified counter, and updating positions of the selected memory pages of the second workload in the second LRU data structure and the group numbers assigned to the selected memory pages of the second workload based on their updated positions in the second LRU data structure;
generating data for constructing miss-rate curves for the first workload and the second workload using the first LRU data structure and the second LRU data structure, respectively; and
deallocating a portion of memory allocated to the first workload and allocating said portion to the second workload based on the miss-rate curves.

2. The method of claim 1, further comprising:
setting a sampling period, wherein accesses to the selected memory pages of the first workload and the second workload are detected only once during any one sampling period.

3. The method of claim 1, further comprising:
installing traces on the selected memory pages of the first workload and the second workload, wherein an access to a selected memory page is detected when the trace installed on the selected memory page is triggered.

4. The method of claim 3, wherein said installing the traces includes: removing mappings of the selected memory pages of the first workload and the second workload from a virtual memory space to a physical memory space.

5. The method of claim 4, wherein the workloads are virtual machines and the virtual memory space is a guest-physical memory space and the physical memory space is a machine memory space.

6. The method of claim 5, wherein only write accesses to the selected memory pages are detected.

7. The method of claim 5, wherein both read and write accesses to the selected memory pages are detected.

8. The method of claim 4, wherein the workloads are virtual machines and the virtual memory space is a guest-virtual memory space and the physical memory space is a machine memory space.

9. A non-transitory computer readable medium comprising instructions executable by a computing device to perform a method of managing memory allocation in a host machine having workloads running therein, said method comprising:

selecting a subset of memory pages for a first workload running on the host machine and maintaining a first least recently used (LRU) data structure for the selected memory pages of the first workload, the first LRU data structure including a counter for each position in the first LRU data structure, wherein each of the selected memory pages of the first workload is assigned a group number representative of its position in the first LRU data structure;

selecting a subset of memory pages for a second workload running on the host machine and maintaining a second LRU data structure for the selected memory pages of the second workload, the second LRU data structure including a counter for each position in the second LRU data structure, wherein each of the selected memory pages of the second workload is assigned a group number representative of its position in the second LRU data structure; and while the first workload and the second workload are running:
  detecting accesses to the selected memory pages of the first workload;
  in response to detecting each access to a selected memory page of the first workload, identifying a counter to be incremented using the group number of the selected memory page of the first workload, incrementing the identified counter, and updating positions of the selected memory pages of the first workload in the first LRU data structure and the group numbers assigned to the selected memory pages of the first workload based on their updated positions in the first LRU data structure;
  detecting accesses to the selected memory pages of the second workload;
  in response to detecting each access to a selected memory page of the second workload, identifying a counter to be incremented using the group number of the selected memory page of the second workload, incrementing the identified counter, and updating positions of the selected memory pages of the second workload in the second LRU data structure and the group numbers assigned to the selected memory pages of the second workload based on their updated positions in the second LRU data structure;
  deallocating a portion of memory allocated to the first workload and allocating said portion to the second workload based on the miss-rate curves.

10. The non-transitory computer readable storage medium of claim 9, wherein the method further comprises:
  setting a sampling period, wherein accesses to the selected memory pages of the first workload and the second workload are detected only once during any one sampling period.

11. The non-transitory computer readable storage medium of claim 9, wherein the method further comprises:
  installing traces on the selected memory pages of the first workload and the second workload, wherein an access to a selected memory page is detected when the trace installed on the selected memory page is triggered.

12. The non-transitory computer readable storage medium of claim 11, wherein said installing of the traces includes:
  removing mappings of the selected memory pages of the first workload and the second workload from a virtual memory space to a physical memory space.

13. The non-transitory computer readable storage medium of claim 12, wherein the workloads are virtual machines and the virtual memory space is a guest-physical memory space and the physical memory space is a machine memory space.

14. A method of assessing memory performance of a workload running on a host machine, comprising:
  selecting a subset of memory pages for the workload;
  maintaining a least recently used (LRU) data structure for the selected memory pages, wherein the LRU data structure includes a plurality of ordered entries, each corresponding to one of the selected memory pages, and each of the selected memory pages is assigned a group number representative of its position in the LRU data structure;
  maintaining counters associated with each of the ordered entries;
  setting a sampling period;
  detecting accesses to the selected memory pages during the sampling period;
  for each selected memory page, in response to a detected access that occurred first in time during the sampling period, identifying a counter to be incremented using the group number of the selected memory page, incrementing the identified counter, and updating the LRU data structure, the identifying, incrementing, and updating not being performed in response to subsequent detected accesses during the sampling period; and
  generating data for constructing a miss-rate curve for the workload using the LRU data structure and the counters.

15. The method of claim 14, wherein an access to a selected memory page is detected when a fault is generated and the fault results in a memory access involving the selected memory page.

16. The method of claim 14, further comprising:
  installing traces on the selected memory pages, wherein an access to a selected memory page is detected when the trace installed on the selected memory page is triggered.

17. The method of claim 16, wherein said installing the traces includes: removing mappings of the selected memory pages from a virtual memory space to a physical memory space.

18. The method of claim 17, wherein the workload is a virtual machine and the virtual memory space is a guest-physical memory space and the physical memory space is a machine memory space.

19. The method of claim 18, wherein the workload is a virtual machine and the virtual memory space is a guest-virtual memory space and the physical memory space is a machine memory space.

20. The method of claim 16, further comprising:
  reinstalling traces at the end of the sampling period on the selected memory pages whose traces were triggered during the sampling period.

* * * * *